US007937617B1

(12) United States Patent
Nagineni et al.

(10) Patent No.: US 7,937,617 B1
(45) Date of Patent: May 3, 2011

(54) AUTOMATIC CLUSTERWIDE FAIL-BACK

(75) Inventors: Venkata Sreenivasa Rao Nagineni, Pune (IN); Siddhartha Nandi, Pune (IN); Abhay K. Singh, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 644 days.

(21) Appl. No.: 11/261,269

(22) Filed: Oct. 28, 2005

(51) Int. Cl.
*G06F 11/00* (2006.01)

(52) U.S. Cl. ......................................................... 714/13
(58) Field of Classification Search ...................... 714/13
See application file for complete search history.

(56) References Cited

U.S. PATENT DOCUMENTS

| | | | | |
|---|---|---|---|---|
| 5,463,615 | A * | 10/1995 | Steinhorn | 370/221 |
| 6,018,576 | A * | 1/2000 | Croslin | 379/22.03 |
| 6,163,855 | A * | 12/2000 | Shrivastava et al. | 714/4 |
| 6,256,748 | B1 | 7/2001 | Pinson | 714/6 |
| 6,292,905 | B1 * | 9/2001 | Wallach et al. | 714/4 |
| 6,438,705 | B1 * | 8/2002 | Chao et al. | 714/4 |
| 6,578,158 | B1 * | 6/2003 | Deitz et al. | 714/11 |
| 6,601,128 | B1 * | 7/2003 | Burton et al. | 710/316 |
| 6,789,141 | B2 | 9/2004 | Ayukawa et al. | 710/38 |
| 6,868,442 | B1 * | 3/2005 | Burdeau | 709/223 |
| 6,904,469 | B2 | 6/2005 | Ido et al. | 710/6 |
| 6,954,881 | B1 | 10/2005 | Flynn, Jr. et al. | 714/43 |
| 7,272,674 | B1 | 9/2007 | Nandi et al. | 710/38 |
| 2005/0102562 | A1 * | 5/2005 | Shinohara et al. | 714/15 |
| 2006/0294337 | A1 * | 12/2006 | Hartung et al. | 711/173 |
| 2007/0136393 | A1 * | 6/2007 | Fung et al. | 707/202 |
| 2007/0168711 | A1 * | 7/2007 | Chen | 714/11 |

OTHER PUBLICATIONS

Managing HP Serviceguard for Linux, Manufacturing Part No. B9903-90043, Feb. 2005.*
Failover/Failback Policies on Microsoft Cluster Server, Article 197047, Nov. 20, 2003.*
The Availability Digest HP's ServiceGuard Clustering Facility, May 2007.*

* cited by examiner

*Primary Examiner* — Bryce P Bonzo
*Assistant Examiner* — Amine Riad
(74) *Attorney, Agent, or Firm* — Campbell Stephenson LLP

(57) ABSTRACT

Systems and procedures may be used to coordinate the fail-back of multiple hosts in environments where the hosts share one or more data-storage resources. In one implementation, a procedure for coordinating fail-backs includes monitoring a failed data path to detect a restoration of the data path, polling remaining nodes in response to the restoration, and allowing the first node to resume communications if access has been restored to the remaining nodes.

22 Claims, 9 Drawing Sheets

| LUNS | 1° CONTROLLER | 1° PATHS | 2° CONTROLLER | 2° PATHS |
|---|---|---|---|---|
| A,B,C | ALPHA | 431 441 451 | BETA | 432 442 452 |
| D,E | BETA | 432 442 452 | ALPHA | 431 441 451 |

AUTOMATIC CLUSTERWIDE FAIL-BACK

FIELD OF THE INVENTION

The present invention relates to storage devices in distributed computer systems and, more particularly, to coordinating the fail-back of clustered hosts that share a storage array.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability (HA) situations. Such distributed computing systems typically utilize one or more storage devices in support of the computing systems operations performed by one or more processing host computers. These storage devices may be quite numerous and/or heterogeneous. In an effort to aggregate such storage devices and to make such storage devices more manageable and flexible, storage virtualization techniques are often used. Storage virtualization techniques establish relationships between physical storage devices, e.g. disk drives, tape drives, optical drives, etc., and virtual or logical storage devices such as volumes, virtual disks, and logical units (sometimes referred to as LUNs). In so doing, virtualization techniques provide system-wide features, e.g., naming, sizing, and management, better suited to the entire computing system than those features dictated by the physical characteristics of storage devices. Additionally, virtualization techniques enable and/or enhance certain computing system operations such as clustering and data backup and restoration.

FIG. 1 is a simplified block diagram of a computing system 100. The members of the computing system 100 include hosts 130, 140, and 150. The hosts 130, 140, and 150 may typically be computer systems that include software and hardware components well known to those having skill in the art. In various settings, the hosts may also be referred to as nodes, reflecting their participation in a networked system. The hosts 130, 140, and 150 may operate as a cluster in which these hosts are interconnected and may share the computing load involved in various computing tasks. In support of various applications and operations, the hosts may exchange data over, for example, a network 120 such as an enterprise-wide intranet or other local area network (LAN), or over a wide area network (WAN) such as the Internet. Additionally, the network 120 may allow various client computer systems 110 to communicate with the hosts 130, 140, and 150. In addition to using the network 120, the hosts 130, 140, and 150 may communicate with each other and with other computing hosts over a private network 121 that more directly connects the hosts.

Other elements of computing system 100 may include a storage area network (SAN) 125 and storage devices such as a tape library 160 (typically including one or more tape drives), a group of disk drives 170 (i.e., "just a bunch of disks" or "JBOD"), and a storage array 180 such as an intelligent disk array. As shown in FIG. 1, the hosts 130, 140, and 150 may be coupled to the SAN 125. The SAN 125 is conventionally a high-speed network that allows the establishment of direct connections between the storage devices 160, 170, and 180 and the hosts 130, 140, and 150. The SAN 125 may also include one or more SAN-specific devices such as SAN switches, SAN routers, SAN hubs, or some type of storage appliance. The SAN 125 may also be coupled to additional hosts. Thus, the SAN 125 may be shared between the hosts may and allow for the sharing of storage devices between the hosts to provide greater availability and reliability of storage. Although the hosts 130, 140, and 150 are shown connected to the storage devices 160, 170, and 180 through the SAN 125, this need not be the case. Shared resources may be directly connected to some or all of the hosts in the computing system, and the computing system 100 need not include a SAN. Alternatively, the hosts 130, 140, and 150 may be connected to multiple SANs.

FIG. 2 is a simplified block diagram illustrating in greater detail several components of the computing system 100. For example, the storage array 180 is illustrated with two input/output (I/O) ports 181 and 186. Associated with each I/O port is a respective storage controller 182 and 187. In this illustration, the controller 182 is also referred to as alpha and the controller 187 is also referred to as beta. Each storage controller generally manages I/O operations to and from the storage array through the associated I/O port. In this example, the controller 182 includes a processor 183, a memory cache 184 and a regular memory 185. The processor 183 is coupled to the cache 184 and to the memory 185. Similarly, the controller 187 may include a processor 188, a memory cache 189 and a regular memory 190. The processor 188 is coupled to the cache 189 and to the memory 190.

Although one or more of each of these components is typical in storage arrays, other variations and combinations are well known in the art. The storage array may also include some number of disk drives accessible by both storage controllers. As illustrated, each disk drive is shown as a logical unit (LUN), which is generally an indivisible unit presented by a storage device to a host or hosts. In the illustrated example, the storage array 180 holds five LUNs 191-195, which are also referred to as LUNs A-E, respectively. Logical unit numbers, also sometimes referred to as LUNs, are typically assigned to logical units in a storage array so a host may address and access the data on those devices. In some implementations, a LUN may include multiple physical devices, e.g., several disk drives, that are logically presented as a single device. Similarly, in various implementations a LUN may consist of a portion of a physical device, such as a logical section of a single disk drive.

FIG. 2 also illustrates some of the software and hardware components present in the hosts 130, 140, and 150. The host 130 may execute one or more application programs 131. Such applications may include, but are not limited to, database administration systems (DBMS), file servers, application servers, web servers, backup and restore software, customer relationship management software, and the like. The applications and other software not shown, e.g., operating systems, file systems, and applications executing on client computer systems 110 may initiate or request I/O operations against storage devices such as the storage array 180. The host 130 may also execute a volume manager 133 that enables physical resources configured in the computing system to be managed as logical devices. An example of software that performs some or all of the functions of a volume manager 133 is the VERITAS Volume Manager™ product provided by VERITAS Software Corporation. The host 130 may take advantage of the fact that the storage array 180 has more than one I/O port by using a dynamic multipathing (DMP) driver 135 as well as multiple host bus adaptors (HBAs) 137 and 139. The HBAs may provide a hardware interface between the host bus and the storage network, typically implemented as a Fibre Channel network. The host 130 may have multiple HBAs to provide redundancy and/or to take better advantage of storage devices having multiple ports. Other hosts may also execute software, such as programs 141, a volume manager 143, and a DMP driver 145 on the host 140; and programs 151, a volume manager 153, and a DMP driver 155 on the host 150. The other hosts may also use HBAs, such as HBAs 147 and 149 on the host 140, and HBAs 157 and 159 on the host 150.

The DMP functionality may enable greater availability and performance by using path fail-over and load balancing. In general, the multipathing policy used by the DMP drivers 135, 145, and 155 depends on the characteristics of the storage array in use.

Active/active storage arrays (A/A arrays), for example, are one type of storage array. A/A arrays permit several paths to be used concurrently for I/O operations. Other types of storage arrays, such as active/passive arrays, may generally designate one path for accessing particular resources on the array, while other paths are reserved as redundant backups.

Active/passive arrays with so-called auto-trespass mode (A/P arrays) allow I/O operations on one or more primary path while one or more secondary path is available in case the primary path fails. For example, if the storage array 180 is implemented as an A/P array, then the storage array 180 may designate a primary path and a secondary path for each of the LUNs in the storage array.

For example, the storage array 180 may designate the controller 182 as the primary controller for the LUNs 191, 192, and 193. Accordingly, the primary paths for these LUNs would include the controller 182, the I/O port 181, relevant portions of the SAN 125, and one or both of the HBA's in each of the hosts 130, 140, and 150. The storage array may also designate secondary paths as redundant backup paths for access to LUNs 191, 192, and 193. The secondary paths would include a different controller than the primary controller 181. In the illustrated example, the secondary paths would include the controller 187, the I/O port 186, relevant portions of the SAN 125, and one or both of the HBAs in each of the hosts 130, 140, and 150.

While the controller 182 and the associated elements may be designated as the primary path for some of the LUNs, the controller 187 and the associated elements may be designated as the primary controller for other LUNs. For example, the LUNs 191, 192, and 193 may have a primary path that includes the controller 182 and a secondary path that includes the controller 187. At the same time, the LUNs 194 and 195 may have a primary path that includes the controller 187 and a secondary path that includes the controller 182.

To communicate with a LUN on a storage array, a host may normally use only one of the available paths. This path may be called the active path; the remaining path may be called the passive path. This arrangement allows the controllers 182 and 187 more readily to manage data traffic and caching for their respective LUNs. When a host communicates with a LUN over a path that is not the path designated for current use with that LUN, the communication is considered a trespass on that path.

In the event that the primary path for a LUN fails, a host will need to turn to that LUN's secondary path until external measures have corrected the problem with the primary path. This process of the host and the storage array switching paths in response to failure of the primary path may be known as a fail-over. Similarly, the process of the host and the storage array switching back to the primary path after the restoration of the primary path may be known as a fail-back.

In active/passive arrays with auto-trespass features, a trespass may be interpreted as a situation that requires a fail-over or a fail-back. Active/passive arrays may alternatively be configured without an automated response to trespasses. For example, active/passive arrays in explicit fail-over mode (A/PF arrays) may require a special command to be issued to the storage array for fail-over or fail-back to occur, such as a SCSI command or a Fibre Channel command. Yet another example of storage arrays are active/passive arrays with LUN group fail-over (A/PG arrays). A/PG treat a group of LUNs that are connected through a controller as a single fail-over entity. The primary and secondary controllers are each connected to a separate group of LUNs. If a single LUN in the primary controller's LUN group fails, all LUNs in that group fail over to the secondary controller's LUN group.

In situations where only one host communicates with a storage array, various techniques may be used to ensure that the host and the storage array stay synchronized regarding which path is currently being used to access a resource on the storage array. However, if multiple hosts share the resources of a storage array (or multiple storage arrays), the task of synchronization may become more intricate. A host needs to coordinate not only with the storage array, but also with the other hosts in the system regarding which paths are to be used for various resources on the storage array.

Under certain circumstances, it is possible for two or more hosts to lose synchronization with each other regarding which path—primary or secondary—is the path currently designated for use with a resource. Such inconsistencies between the hosts may have undesirable consequences. For example, one host may trigger an undesired fail-over or a fail-back by unintentionally communicating with a LUN on a path that is not considered the current path by other hosts.

Accordingly, it may be helpful to have automated tools for reducing or preventing mismatches in the designation of data paths used by processing hosts for communicating with storage arrays. Further, it may be helpful to employ techniques for reducing or preventing such mismatches during fail-back activities in clustered computing environments.

SUMMARY OF THE INVENTION

Described herein are systems and procedures that may be usable for coordinating the fail-back of multiple hosts that share one or more data-storage resources. In one implementation, a procedure for coordinating fail-backs includes monitoring a first data path. The first data path communicates data from a first node in a computation cluster, through a first controller on a storage array, to a resource on the storage array. The resource may be, for example, a LUN or a group of LUNs on the storage array. The monitoring may be used to determine that the first data path has been restored. In response to this restoration, the procedure may then poll all of the remaining nodes in the cluster to determine if access to the resource through the first controller has been restored for each of the remaining nodes. (Alternatively, instead of polling all of the remaining nodes, the procedure may only poll those nodes that may benefit from a restoration of communications through the first controller.) If access has been restored through the first controller for each node, the procedure may then allow the first node to resume communications with the resource through the first controller. The procedure may also allow each of the remaining nodes to resume communications with the resource through the first controller.

In one implementation, a system includes a first host and a master host. The system may be useful for coordinating a simultaneous cluster-wide fail-back of a communications path. The first host may include a restoration detection module and a query module. The restoration detection module may monitor a failed communications path to a storage resource. In response to the restoration detection module detecting a restoration of the failed communications path, the query module configured may request approval for a fail-back from the master host. The master host may include a coordination module. In response to the request from the first host, the coordination module may determine if one or more other hosts in the system host is also ready to perform a fail-back. If each of the other hosts are ready to perform a fail back, the coordination module may communicate an approval for fail-back to the first host.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

It has been found that multi-host environments are susceptible to situations in which the various hosts have inconsistent records regarding which paths are designated for current use in communicating with LUNs on storage arrays that serve the hosts. One source of inconsistency may be a group fail-back policy implemented in a storage array. The storage array may perform a group fail-over or group fail-back of several LUNs when only one of the grouped LUNs has experienced a path failure or path restoration. Some of the hosts in a cluster may be unaware of the extent of the fail-over or fail-back, because these hosts may not be in communication with all the grouped LUNs at the time of the fail-over or fail-back. These hosts may lose synchronization with other hosts in the cluster, and may designate inappropriate paths for some of the LUNs in the storage array.

Another source of inconsistency is the situation where a network connecting a cluster with a storage array undergoes a piecemeal restoration of a failed primary path. In such situations, some hosts may revert to using the restored primary paths, while other hosts need to continue using the secondary paths.

As a result of such inconsistencies, some of the hosts may use a secondary controller for communicating with resources in a storage array, while other hosts use a primary controller for communicating with the resources. This situation may hinder system performance. For example, in the case of A/P arrays, such simultaneous use of both the primary and secondary paths may significantly degrade the performance of the storage array.

To avoid such inconsistencies among various hosts that share a storage array, existing systems may simply inhibit fail-backs until an operator has determined that each of the primary paths to the various hosts has been restored. Thus, after a fail-over, the various hosts in a system may continue to use the secondary paths, even after the primary paths become available. To perform a fail-back to the primary paths, an operator may eventually investigate the status of the various data paths. For example, an operator may issue appropriate commands, such as a "vxdctl" command for the volume managers 133, 143, and 153, to discover the health status of the data paths. Once an operator has verified that the primary paths have been restored, the operator may manually initiate a fail-back so that the hosts return to using the restored primary paths for communicating with LUNs on the storage array. However, such manual intervention may substantially delay a failover, and may hinder system performance.

Figure 3:
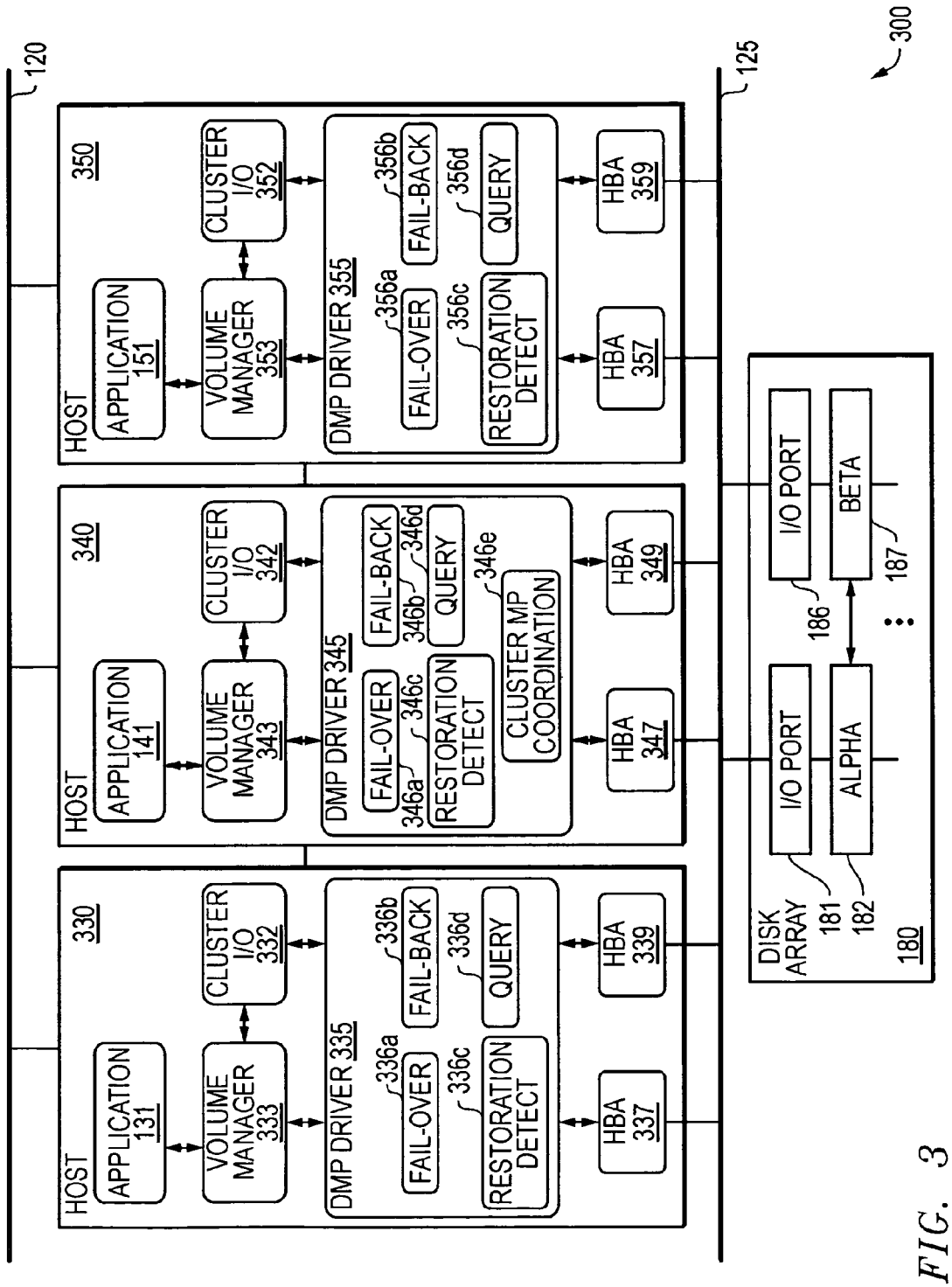
FIG. 3 is a simplified block diagram illustrating one implementation of a system in which a cluster of host processors is configured for multipath communication with a storage array.

FIG. 3 is a simplified block diagram illustrating one implementation of a system 300 in which a cluster of host processors is configured for multipath communication with a storage array. The system 300 includes host processors 330, 340, and 350. The hosts 330, 340, and 350 may be configured in a cluster that coordinates operations to share the load of various processing jobs. The coordination may be arranged through direct connections in a private network, or through a network such as the LAN 120. The hosts may be configured to share access to one or more storage devices such as the storage array 180. To assist in multipathing operations for access to the storage array 180, the hosts 330, 340, and 350 may execute DMP drivers 335, 345, and 355 respectively. The hosts 330, 340, and 350 may also execute volume managers 333, 343, and 353, respectively, to work with the DMP drivers and enable various physical resources to be managed as logical devices. Further software executed by the hosts 330, 340, and 350 may also include cluster I/O modules 332, 342, and 352, respectively, which may enable the communication of messages among hosts in a cluster to coordinate multipath usage and other cluster operations.

Figure 1:
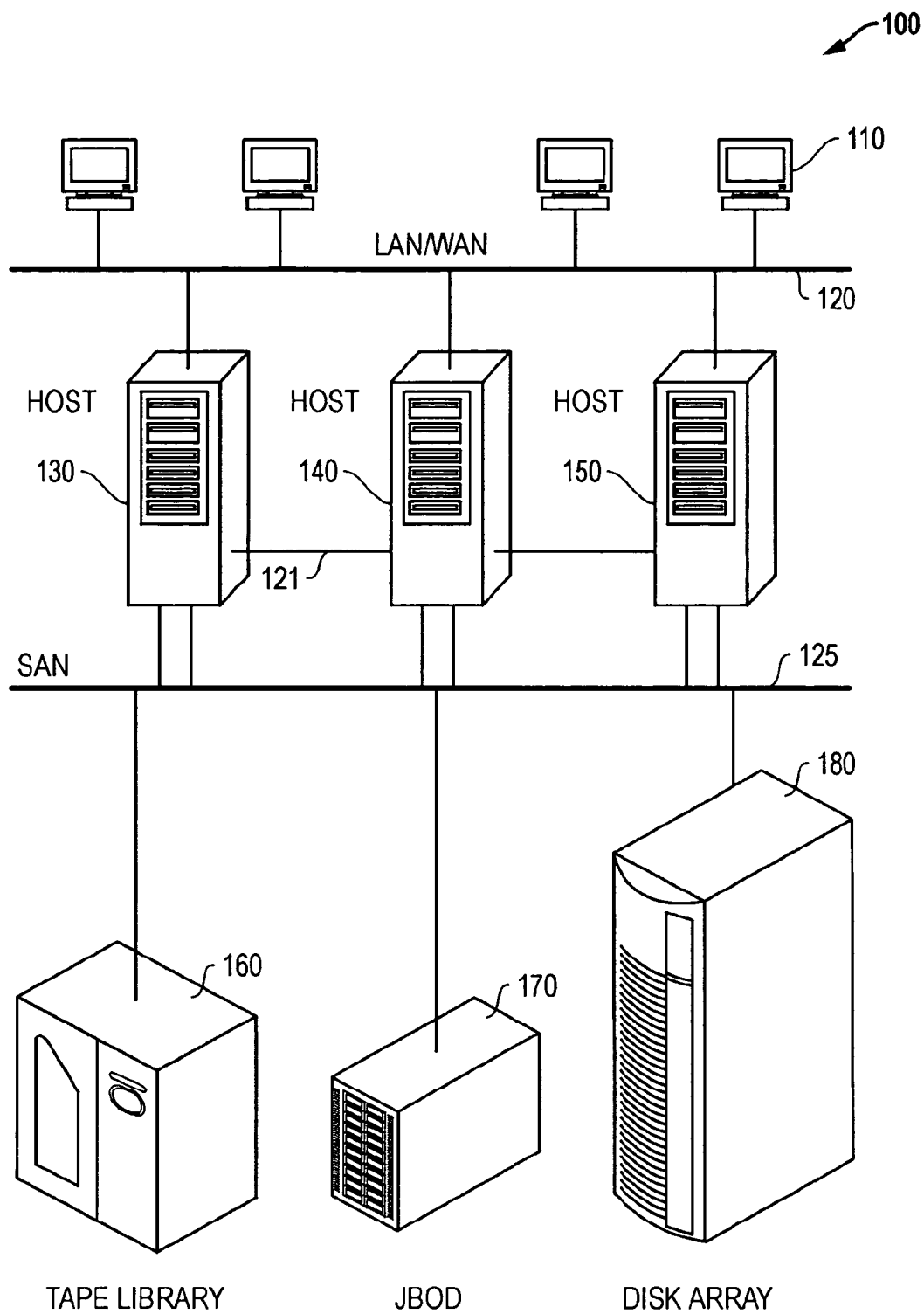
FIG. 1 is a simplified block diagram of a computing system.
Figure 2:
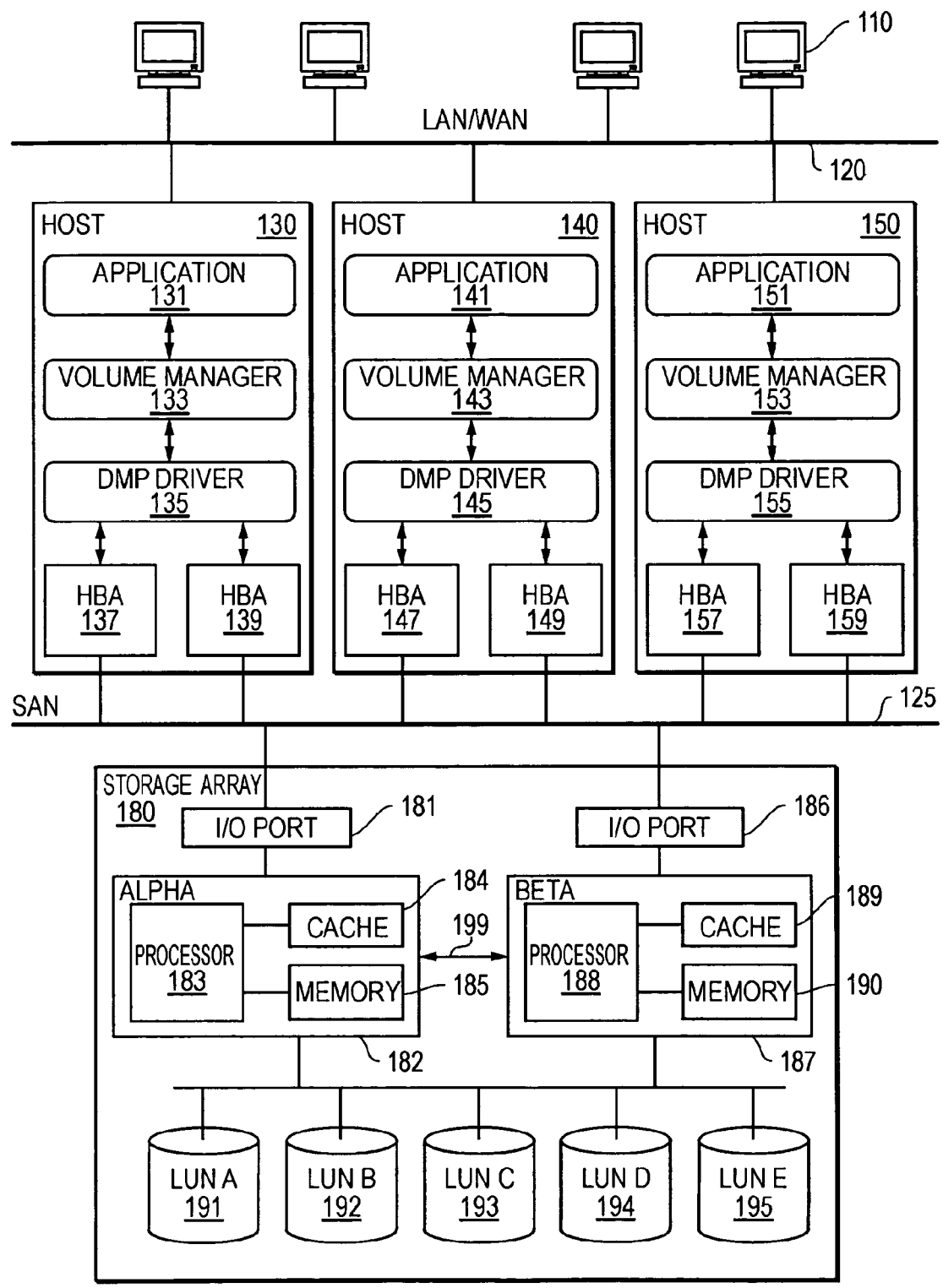
FIG. 2 is a simplified block diagram illustrating in greater detail several components of the computing system shown in FIG. 1.

The system 300 may also employ components similar to those described above with reference to FIGS. 1 and 2. For example, the hosts 330, 340, and 350 may also execute various application programs 131, 141, and 151, respectively. The LAN 120 may allow various client computer systems (not shown) to communicate with the hosts. As illustrated, the host processor 330 may include HBAs 337 and 339 for coupling to the storage array 180 through the SAN 125. Similarly, the host processor 340 may include HBAs 347 and 349, and the host processor 350 may include HBAs 357 and 359. The host processors may use the DMP drivers to take advantage of multiple pathways available to access the storage array 180, such as alternate pathways through the controller 182 and the controller 187 in the storage array 180.

The DMP driver 335 in the host 330 may be configured with a fail-over module 336a, a fail-back module 336b, a restoration detection module 336c, and a query module 336d. Depending on the particular implementation of the DMP driver, some of these modules may be integrated with each other and/or with the cluster I/O module 332. The fail-over module 336a may be configured to decide when a fail-over should be initiated. In general, the fail-over module may initiate a fail-over when the DMP driver 335 detects or is notified of a failure of a primary path. The fail-over module 336a may operate under the DMP driver 335 to carry out fail-overs by updating local path-designation records in the host 330. The fail-over module 336a may also send appropriate interface commands (such as SCSI or Fibre Channel commands) to the storage array to harmonize the path designations in the storage array 180 with the path designations in the host processor. The fail-over module 336a may similarly send appropriate messages to other hosts in the cluster, to harmonize the path designations in the storage array 180 with the path designations in the other hosts. The restoration detection module 336c may be configured to monitor failed paths. The restoration detection module 336c may be configured to detect restorations of failed data paths after the host 330 has performed a fail-over. The restoration detection module 336c may also be configured to trigger alerts in response to path restorations. When the restoration detection module 336c detects or is notified that a path has been restored, the DMP driver 335 may take steps towards restoring communication on the restored path. The fail-back module 336b and the query module 336d may be configured to perform a fail-back to the restored path in an orderly manner, by coordinating the fail-back with other hosts in the system 300.

The DMP drivers in the hosts 340 and 350 may be similarly configured, respectively, with fail-over modules 346a and 356a, fail-back modules 346b and 356b, restoration detection modules 346c and 356c, and query modules 346d and 356d. Additionally, the DMP driver 345 in the host 340 may be configured with a cluster multipath coordination module 346e. The coordination module 346e may be used as a centralized manager to decide when an entire cluster (or other group of hosts) is ready to perform a fail-back. The coordination module 346e may be configured to oversee the coordination of fail-back operations using software components outside of the DMP driver 345, such as by using the cluster I/O module 342. Similarly, the coordination module 346e may be deployed as a component of the cluster I/O module 342.

The coordination module 346e may be configured to prevent a fail-back until each host that has undergone a fail-over has re-established communication with the controller(s) involved in the original path failure(s). In general, only one host in a cluster (or other grouping) of hosts may need to execute such a coordination module, so that fail-backs may be managed in a centralized manner. While some or all of the hosts in a cluster may be equipped with software for a coordination module, in general it is not necessary for all hosts to execute this module. Rather, the coordination module may be executed by only some of the hosts, or by only one of the hosts—as depicted in the example of FIG. 3.

A host executing a coordination module, such as the host 340, may be referred to as a master host or a master node. The coordination module 346e in the master host 340 may be configured to communicate with the query modules 336d, 346d, and 356d in the various nodes to coordinate fail-backs on a system-wide basis. For example, in the host 330, the query module 336d may communicate with the restoration detection module 336c. When the restoration detection module 336c determines that a failed primary path appears to be once again available, the query module 336d may be configured to send a message to the master host's coordination module 346e, alerting it of the restoration detected by the host 330. This message may be understood by the coordination module 346e as a query that requests approval for the host 330 to fail back and use the now-available primary path.

In response to receiving a query from the host 330, the coordination module 346e may transmit a message to the DMP software in each of the other hosts 340 and 350, asking if those hosts are also ready to perform a fail-back. In response to receiving this message, the other hosts may trigger their respective restoration detection modules 346c and 356c to check on the local availability of the failed primary path. The other hosts may then respond to the coordination module 346e by indicating whether of not the failed primary path has been restored for use by those hosts.

If fewer than all of the relevant hosts respond that the failed primary path has been restored for use by those hosts, the coordination module 346e may either do nothing or may inform the hosts to continue to use the secondary path. Once all of the relevant hosts respond that the failed primary path has been restored for use by those hosts, the coordination module 346e may transmit a fail-back message to all of the relevant hosts, instructing them to perform a fail-back. The fail-back modules 336b, 346b, and 356b in each of the hosts may then initiate a fail-back so that the hosts return to using the restored primary path.

Although the DMP drivers 335, 345, and 355 and various other features have been described in the context of a standard host computer system, it should be noted that these features and functionality may be implemented in a variety of other architectures such as clustered computing systems and specialized storage devices (e.g., SAN switches, SAN routers, SAN hubs, or some type of storage appliance). Moreover, the present systems, methods, devices, and software may be implemented in conjunction with a variety of different virtualization schemes (e.g., host based, appliance based, storage based, in-band, out-of-band, etc.) and indeed with no virtualization scheme at all. Similarly, a variety of different storage devices, and indeed addressable storage objects generally, may be used in conjunction with the methods, devices, and software disclosed.

Figures 4, 5:
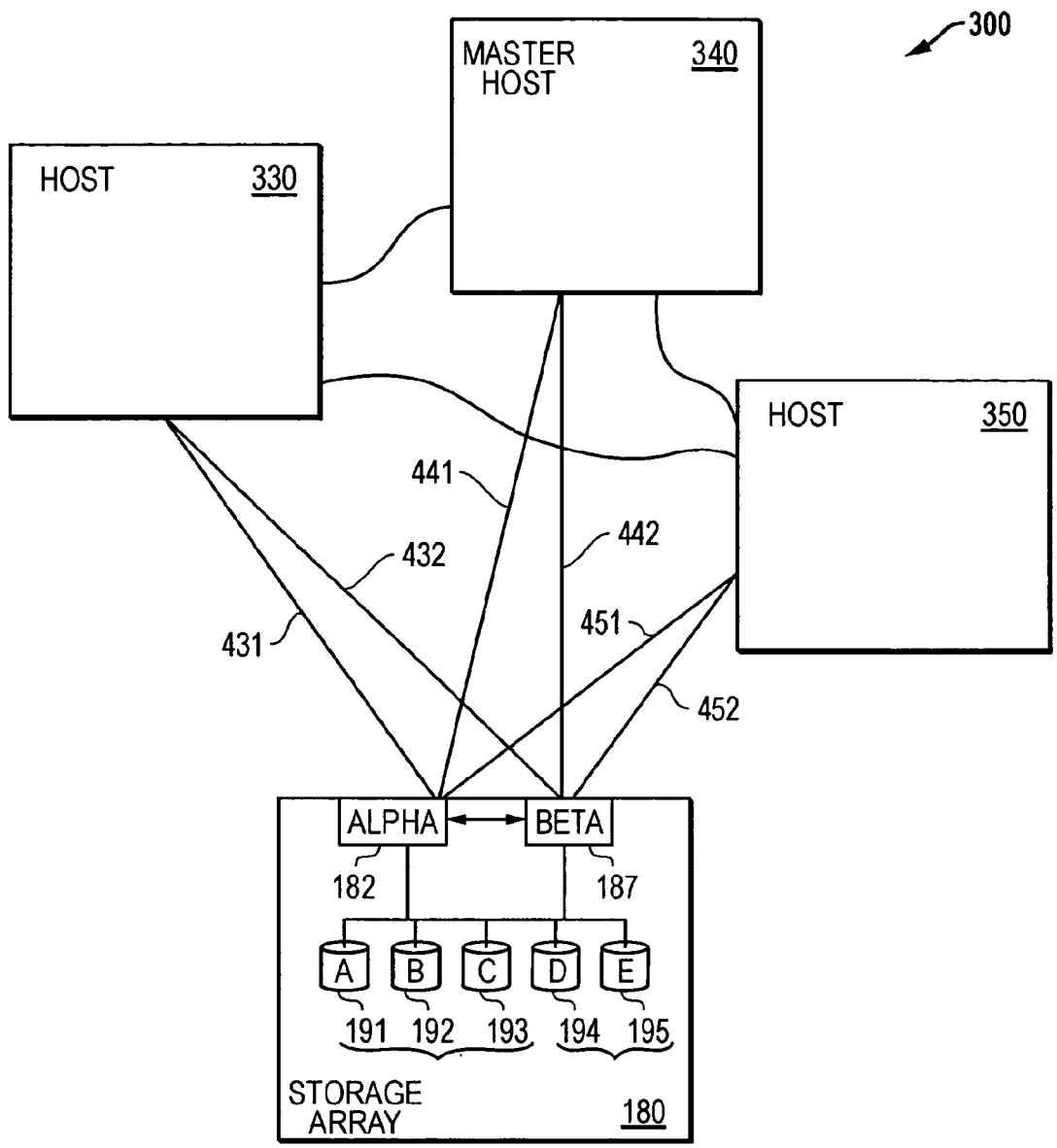
FIG. 4 is a block diagram illustrating connections among the host processors and the storage array from FIG. 3.
FIG. 5 is a table illustrating an example of path assignments in the system from FIG. 4.

FIG. 4 is a block diagram illustrating connections among the host processors and the storage array in the system 300. The diagram shows the hosts 330 and 350, the master host 340, and the storage array 180, and various connections among these elements. As illustrated, several connections provide communication among the hosts 330, 340, and 350. The diagram also shows connections illustrating logically distinct data paths between the hosts and the storage array. These data paths may be carried by the SAN 125 shown in FIG. 3.

In this implementation of the system 300, each of the three hosts 330, 340, and 350 is provided with a data path to each of the two controllers 182 and 187 on the storage array. Thus, three pairs of paths are illustrated in this example. The host 330 is connected to the storage array 180 by a pair of paths: a path 431 connects the host 330 to the controller 182 (also referred to as alpha) and a path 432 connects the host 330 to the controller 187 (also referred to as beta). The host 340 is also connected to the storage array by a pair of paths: a path 441 connects the host 340 to the controller alpha and a path 442 connects the host 340 to the controller beta. Similarly, the host 350 is connected to the storage array by a pair of paths: a path 451 connects the host 350 to the controller alpha and a path 452 connects the host 350 to the controller beta. The hosts and the storage array may assign one of the paths in each pair to be a primary path for communicating with various LUNs on a storage array, while the other path in each pair may serve as a redundant secondary path for those LUNs.

FIG. 5 is a table illustrating an example of such path assignments in the system 300. In this example, the LUNs 191, 192, and 193 (also referred to as A, B, and C, respectively) have been grouped together and the controller alpha has been designated as the primary controller for these LUNs. Similarly, the LUNs 194 and 195 (also referred to as D and E, respectively) have been grouped together, and the controller beta has been designated as the primary controller for those LUNs. As a result of these groupings, the paths 431, 441, and 451 serve as primary paths for the LUNs A-C, since these paths access the storage array through the controller alpha. Similarly, the paths 432, 442, and 452 serve as primary paths for the LUNs D and E, since these paths access the storage array through the controller beta.

The table in FIG. 5 also shows assignments of secondary controllers. The controller beta has been designated as the secondary controller for the LUNs A-C, while the controller alpha is the secondary controller for the LUNs D and E. Thus, the paths 432, 442, and 452 serve as secondary paths for the LUNs A-C, and paths 431, 441, and 451 serve as secondary paths for the LUNs D and E.

The grouping of LUNs and the designation of primary and secondary controllers may be decided by the storage array, or by one or more of the computing hosts, or by a combination thereof. For example, the storage array may define the LUN groups based on various criteria, such as an initial attempt to roughly balance the data traffic on the various data paths. The storage array may then assign each LUN to be a member of one of the groups, with each LUN from a group being designated to use particular data paths as the primary paths to various hosts. In such a situation, the host processors may learn of the assignments by querying the storage array with appropriate interface commands prior to communicating with the LUNs on the storage array.

In the illustrated example, the hosts initially communicate with the LUNs over the designated primary controller. Thus, all three hosts initially communicate with the LUNs A-C through controller alpha and the associated paths (431, 441, and 451). Similarly, all three hosts initially communicate with the LUNs D and E through controller beta and the associated paths (432, 442, and 452). When one or more of the paths fail, however, the affected hosts and LUNs need to switch to communicating via the corresponding secondary paths until the failed path is restored.

Figure 6:
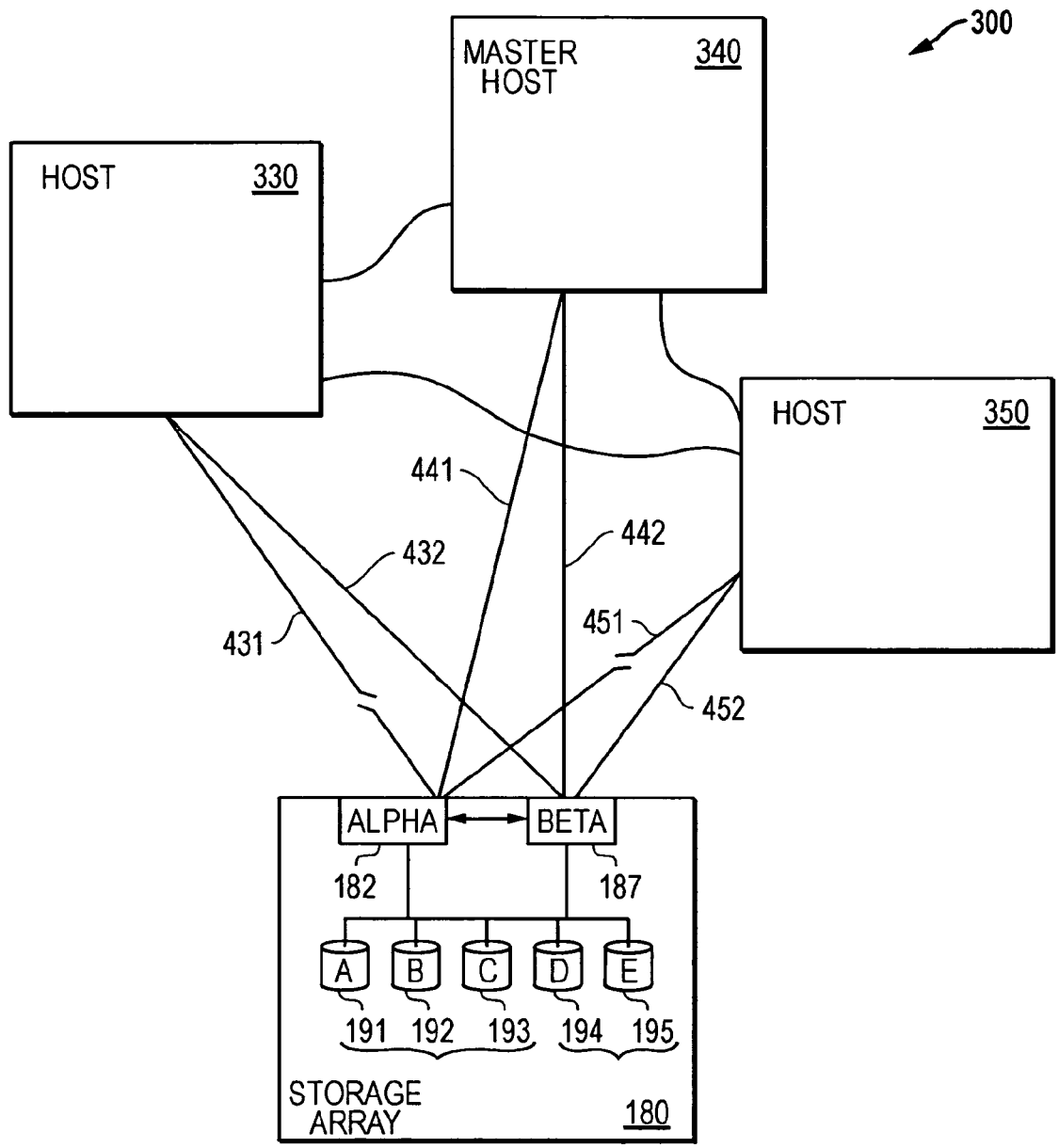
FIG. 6 is a block diagram illustrating a failure of two of the connections from FIG. 4.

FIG. 6 is a block diagram illustrating a failure of two of the connections from FIG. 4. In the illustrated example, paths 431 and 451 have failed. The other four paths remain available. The failed paths 431 and 451 are both coupled to the controller alpha. Thus, these failures only affect the primary paths for the LUNs A-C. Since the primary paths for the LUNs D and E use controller beta, those primary paths are not affected by these two failures.

The illustration in FIG. 6 shows the failures of the paths 431 and 451 as disconnects between the storage array and the hosts. Such disconnects may be understood as representing failures of one or more components in a SAN or other network component that connects the storage array with the hosts. Such component failures may be caused by intentional or unintentional physical rerouting of network cables, or by traffic blockages in the networks, or by power losses, or by other events.

Alternatively, or in addition, the disconnects illustrated in the figure may represent component failures in the storage array or in the hosts. For example, if a failure occurs in the storage array's internal circuitry that connects LUNs A and B with the controller alpha, this internal failure would disrupt the logical data paths between the LUNs and any hosts that use the LUNs A and B—say, the hosts 330 and 350. Such an internal failure would effectively be failures of the data paths 431 and 451. Similarly, if the HBAs 337 and 357 (from FIG. 3) in the hosts 330 and 350 were to fail while these HBAs were assigned to support the paths 431 and 451, then these internal failures would also amount to failures of the data paths 431 and 451.

It can be seen from FIGS. 4 and 5 that in order to continue communication, the hosts 330 and 350 and the LUNs A-C would need to switch to using the corresponding secondary paths, since the paths 431 and 451 are unavailable. These hosts and LUNs would therefore switch to using controller beta and paths 432 and 442 for communication. This switching may be performed as a part of an automated fail-over by the hosts and the storage array.

Depending on the architecture of the storage array 180, the system 300 may also need to take additional corrective measures. In the case where the storage array 180 is an A/P array or an ALUA array, for example, the simultaneous use of two controllers for any one LUN may severely degrade the performance for the storage array. Thus, the storage array 180 may need to avoid using more than one controller for any single LUN. When the hosts 330 and 350 switch to using the controller beta for communications with LUNs A-C, the host 340 may also need to switch to using controller beta for communications with those LUNs. Accordingly, even though the path 441 remains available, the fail-over may need to replace this path as well, since it communicates with the LUNs A-C through controller alpha.

Thus, when the system 300 performs a fail-over for communications between the hosts and the LUNs A-C in response to the failure of the paths 431 and 441, the fail-over may replace all of the primary paths that connect to these LUNs (paths 431, 451, and also 441, which use controller alpha), with the secondary paths for these LUNs (paths 432, 442, and 452, which use controller beta).

Meanwhile, the primary paths that use the controller beta may continue service. Since none of the paths that connect with the controller beta (paths 432, 442, and 452) have been disrupted, these paths may continue to serve as active primary paths for access to the LUNs D and E.

Various techniques may eventually be employed to restore the failed paths 431 and 451. The restoration may take place because of some manual repair by a system operator, or through some automated response by a network component, or through some other corrective measure involving the storage array 180, the paths 431 and 451, or the associated hosts. It is possible that one of these failed paths may be restored while the other is not. Depending on the types of failure, the particular topology of the failed paths, the architecture of the connections (such as the SAN 125), the architecture of the storage array, and the particular restoration measures employed in a particular situation, this restoration of fewer than all the failed paths may impact the multipathing features of the system 300.

Figure 7:
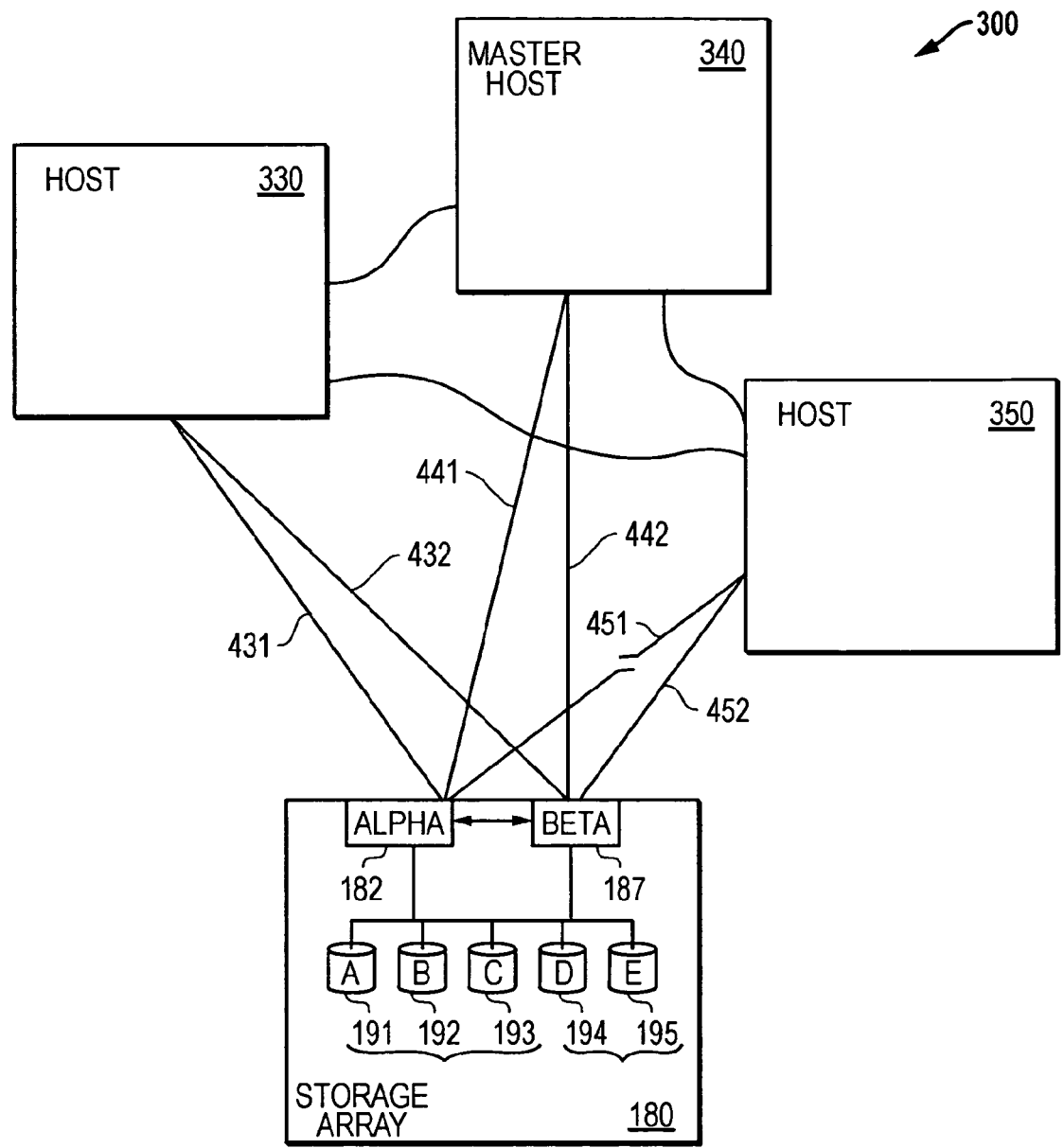
FIG. 7 is a block diagram illustrating a restoration of one of the connections from FIG. 6.

FIG. 7 is a block diagram illustrating a restoration of one of the connections from FIG. 6. This example illustrates a partial restoration of the failures that induced the original fail-over. It has been found that such situations may lead to mismatches among the data hosts regarding which data paths are to be used for communications with the storage array, and may also lead to significant performance degradation of the storage array 180.

In the illustrated situation, one of the failed paths (431) has been restored while another failed path (451) has not. In this situation, the host 330 may detect that the primary path 431 to LUNs A-C has been restored, and may respond by initiating a fail-back, so that the host 330 internally notes that the restored path 431 is once again to be used for communication with LUNs A-C. Such a response would lead to a mismatch between the host 330 and the other hosts regarding which controller is to be used for access to LUNs A-C. For example, the host 330 may then use the path 431 and the controller alpha to communicate with the LUN A. Contemporaneously, the host 340 may use the path 442 and the controller beta to communicate with the LUN C, while the host 350 may use the path 452 and the controller beta to communicate with LUN B. Thus, the grouped LUNs A, B, and C may be accessed both through the controller alpha and through the controller beta at the same time. It is noticed that if the storage array is configured to allow multiple hosts to access a single LUN, then an exacerbated situation may also arise, in which LUN A itself may be accessed both through the controller alpha and through the controller beta by various hosts.

This multiple-controller access of the grouped LUNs may severely degrade performance of the storage array. For example, if the storage array 180 uses auto-trespass procedures, the storage array may respond by alternately designating the controller alpha and the controller beta as the current controller for access to the LUNs, in response to receiving communications for the LUN group on each of those controllers. This alternating may be described as a "ping-pong" effect, and may severely degrade performance as the storage array expends resources to move cached data and other supporting information back and forth between the caches 184 and 189 (from FIG. 2) and between the memories 185 and 190 in the two controllers.

One approach to avoiding such undesired results is to ensure that all the relevant hosts maintain matched records regarding which controller to use for access to a LUN or a group of LUNs. To ensure that the hosts using a group of LUNs consistently use a single controller, the hosts may be configured to avoid performing automated individual fail-backs. For example, the system 300 may be configured so that the situation in FIG. 7 does not trigger a fail-back in the host 330. One approach is to disable automated fail-backs, so that host 330 continues to use the secondary path 432 until a manual intervention returns the hosts to the primary paths for the LUNs A-C.

Yet another approach is to allow the hosts to perform automated fail-backs, but (a) only after all the relevant hosts have determined that the fail-back is possible, and (b) substantially simultaneously with the other relevant hosts. Such a coordinated fail-back procedure may be managed, for example, by a single master host in a cluster or other group of hosts. By coordinating the fail-back, the master host may ensure that all hosts in a cluster consistently use only one controller at a time for accessing a group of LUNs (or a single LUN) on a storage array.

Figure 8:
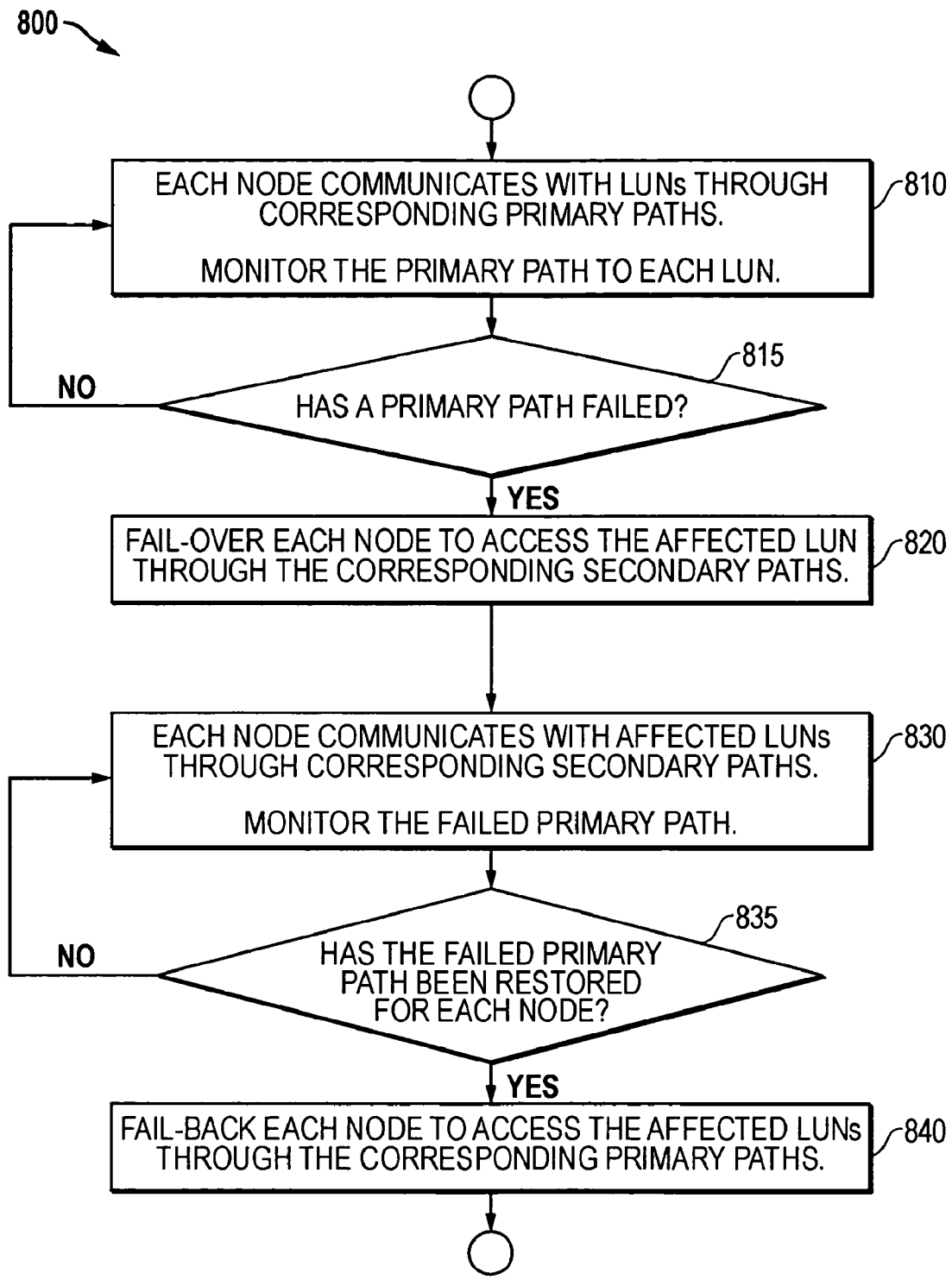
FIG. 8 is a flow chart illustrating one implementation of a procedure for preventing mismatches of path assignments among host processors.

FIG. 8 is a flow chart illustrating one implementation of a procedure 800 for preventing mismatches of path assignments among host processors. This procedure 800 may be used to keep the records synchronized in relevant host processors regarding which data paths and/or storage array controllers are to be used for accessing LUNs, groups of LUNs, or other resources on a storage array.

The procedure 800 may be understood as commencing during normal operation of a multi-host system such as the system 300 from FIG. 3. The hosts may be called nodes in various environments, such as cluster environments. In act 810, each node carries out computing tasks that involve reading and/or writing data to various LUNs on one or more storage arrays. The nodes may communicate with the LUNs through agreed-upon primary paths to the LUNs. The primary paths from various nodes to a single LUN may be selected so that they each use the same controller on the storage array holding the LUN. Similarly, if the storage array groups LUNs, then the primary paths from various nodes to a single LUN group are selected so that they each use the same controller on the storage array holding the LUN group. The nodes may also monitor the primary path to each LUN, so that the nodes may detect any failures that may occur in the primary paths.

The monitoring in act 810 may be performed using tools such as heartbeat signals, packet probes, keep-alive messages, monitoring daemons, and interrupts, among others. The monitoring may also check for acknowledgements or other verifications of issued read/write commands, to confirm that a path has successfully conveyed a payload message. In various systems, the monitoring may be performed by software running on a node, such as the DMP drivers 335, 345, and 355 illustrated in FIG. 3. The monitoring may repeatedly send a SCSI inquiry command to a port coupled to a primary path to probe the status of the primary path.

The communication and normal operations may continue until a failure is detected 815 on a primary path. In act 820, the system may perform a fail-over for the LUN whose primary path has failed. The fail-over may apply to all of the nodes in the cluster. (Alternatively, the fail-over may apply only to some of the nodes, such as nodes that actively depend on the failed path.) If more than one primary path has failed, all of the corresponding LUNs may be failed over. If a failed path affects a LUN in a group of LUNs, then all of the other LUNs in the group are also deemed to be affected because of the grouping, and may also be failed over. The fail-over may be performed, for example, by appropriate software, such as the fail-over modules 336a, 346a, or 356a illustrated in FIG. 3.

As shown in act 830, each node may then use the secondary path for communication with the affected LUN after the fail-over. Each node may also monitor the failed primary path to determine when the primary path has been restored for use by that node. This monitoring may be performed, for example, by appropriate software, such as the restoration detection modules 336c, 346c, or 356c illustrated in FIG. 3. The monitoring in act 830 may be performed using tools such as heartbeat signals, packet probes, keep-alive messages, monitoring daemons, and interrupts, among others. In various systems, monitoring may be performed by software running on a node, such as the DMP drivers 335, 345, and 355. The monitoring may use a repeated SCSI inquiry command to probe the status of a failed path. Similarly, the monitoring may use a periodic read/write command that is generated as an attempt to access the destination LUN. The monitoring may determine that a failed path has been restored when an acknowledgement is received in response to the read/write command.

The hosts may continue to use the secondary paths until the automated monitoring in act 830 determines that the failed primary paths have all been restored, as indicated in branch point 835. In act 840, the failed-over nodes fail back and once again access the affected LUNs through the primary paths after the failed primary paths have all been restored and are again available for use by each of the nodes that were involved in the fail-over. The fail-back may be performed, for example, by appropriate software, such as the fail-back modules 336b, 346b, or 356b illustrated in FIG. 3.

Figure 9:
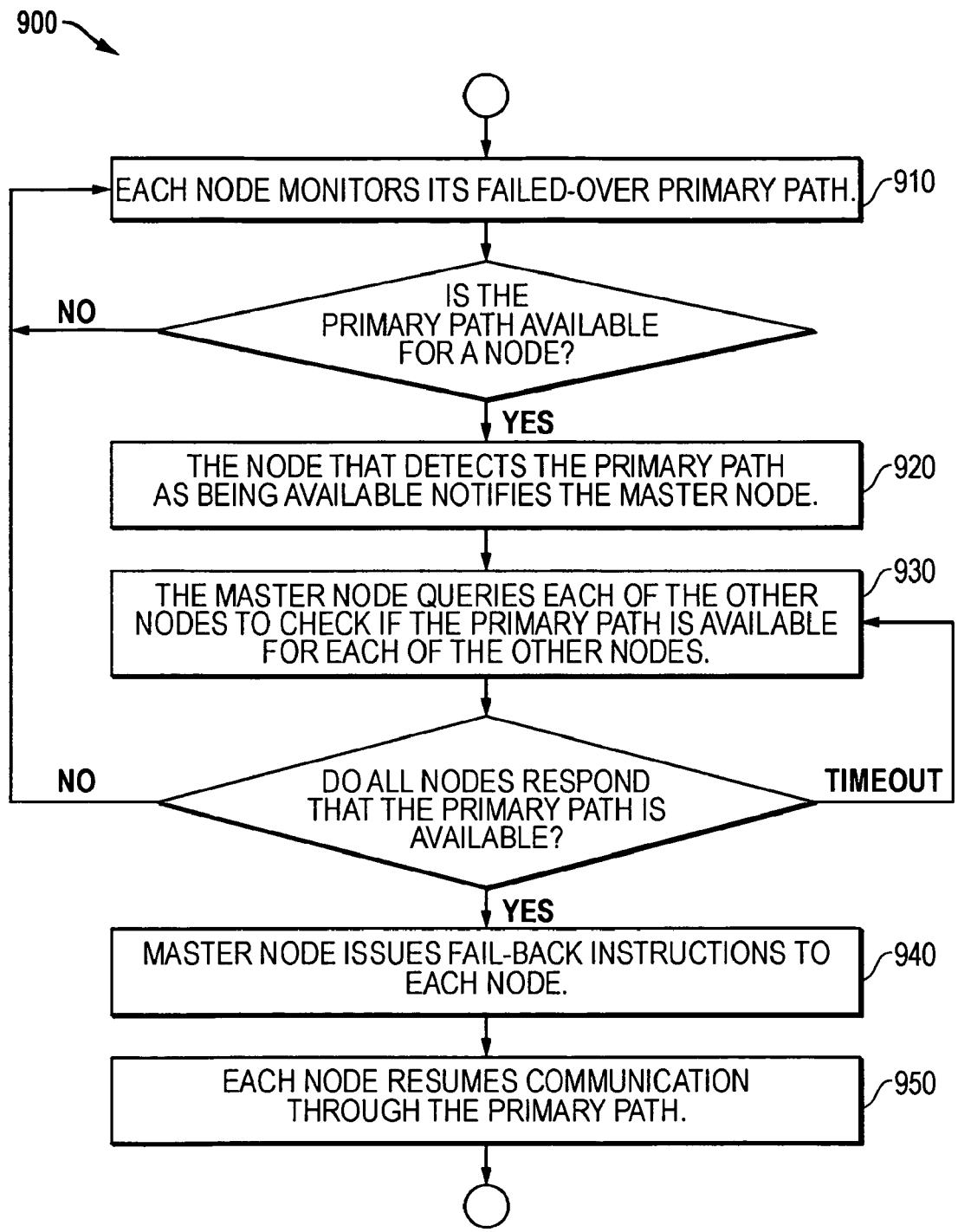
FIG. 9 is a flow chart illustrating one implementation of a procedure for coordinating fail-backs among host processors.

FIG. 9 is a flow chart illustrating one implementation of a procedure 900 for coordinating fail-backs among host processors. The procedure 900 may be used, for example, as a particular implementation of acts 830 and 840 from FIG. 8. The procedure may commence in act 910 with various nodes in a system monitoring failed primary paths to determine when a primary has been restored for use. This monitoring may be performed, for example, by software running on each of the nodes that have undergone a fail-over. This software may be implemented as modules in a multipath driver, such as, for example, the restoration detection modules 336c, 346c, and 356c from FIG. 3. When a primary path once again becomes available to a node, that node notifies a master node in act 920 of the locally-detected restoration. (It is noted that depending on the system configuration, in some situations, the master node may itself detect the restoration of a formerly failed path. In such situations, the master node may internally notify itself of the locally detected restoration.) This notification may be carried out by interface software, such as, for example, the query modules 336d, 346d, and 356d from FIG. 3. In act 930, the master node may then communicate with each of the other relevant nodes to check if the primary path is available for use by those nodes as well. This communication may be directed by software, such as, for example, the coordination module 346e and the cluster I/O modules 332, 342, and 352 from FIG. 3.

The relevant nodes that are queried in act 930 may be only those nodes that would need or benefit from a fail-back that involves the newly restored primary path from act 920. The procedure 900 may target these nodes for fail-back, without considering a fail-back to be needed for other nodes. Thus, the query in act 930 need not be directed to all the nodes in a cluster. In such a situation, the nodes may respond to the query with relatively simple responses such as "primary path available" or "primary path not available" (or logical equivalents). Alternatively, the procedure 900 may target all the nodes in a cluster for fail-back. In such a situation, the queried nodes may include all of the nodes in the cluster, or may include nodes for which a fail-back may or may not be necessary. In such a situation, the queried nodes may respond with an indication of whether or not they need to be involved in the fail-back. For example, the responses may be "primary path locally available; ready for fail-back," or "primary path not locally available; not ready for fail-back," or "no fail-back required in association with the newly restored primary path" (or logical equivalents).

If one or more of the nodes queried in act 930 responds that it is not yet ready to join in a coordinated fail-back because the primary path has not yet been locally restored for that node, then the procedure 900 returns to act 910 to resume the monitoring by each of the nodes. The procedure 900 also illustrates one usage of a timeout branching. If the master node does not receive a response from all of the nodes queried in act 930 within an appropriate amount of time, the master node may re-issue the query of act 930 one or more times before returning to act 910. Other timeout repetitions (not shown) may also be used in the procedure, depending on various system conditions and local variations in requirements and configurations.

If all of the nodes queried in act 930 respond that they are ready to join in a coordinated fail-back because the primary path has been locally restored for each of those nodes (or respond that they do not need to participate in the fail back), then the procedure 900 proceeds to act 940, in which the master node issues fail-back instructions to each of the nodes that will together participate in a coordinated fail-back. Each of the nodes receiving these instruction may then initiate a fail-back in act 950.

Figure 10:
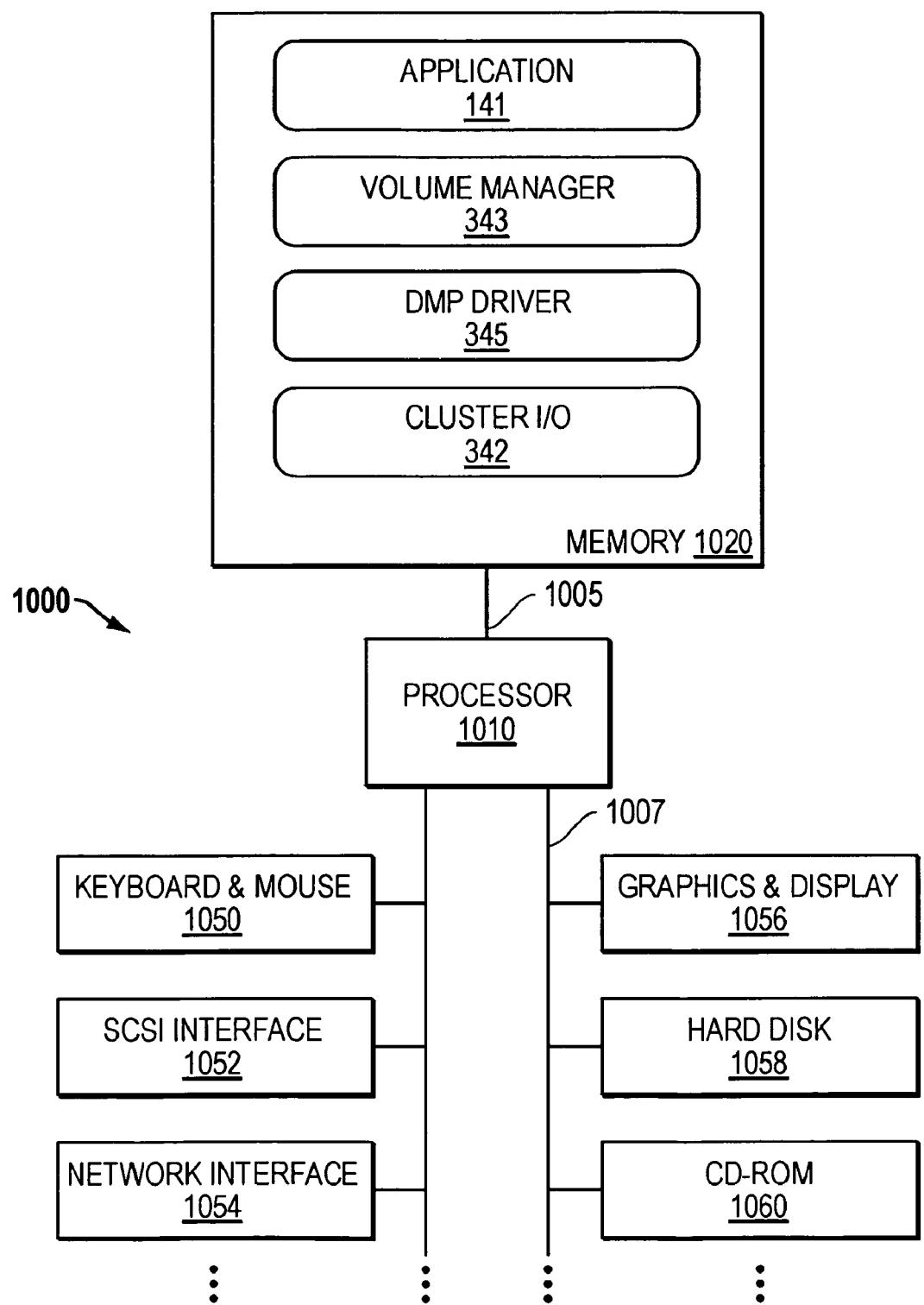
FIG. 10 is a block diagram of one implementation of a computer system that may be used for carrying out the techniques described herein.

FIG. 10 is a block diagram of one implementation of a computer system 1000 that may be used for carrying out the techniques described above. For example, the computer system 1000 may be an embodiment of one of the previously described host processors, such as the host 340. The computer system 1000 may include a processor 1010 and a memory 1020 coupled together by a communications bus 1005. The processor 1010 may be a single processor or a number of individual processors working together. The memory 1020 may be a random access memory (RAM), or some other dynamic storage device, and is capable of storing instructions to be executed by the processor, e.g., the application 141, the volume manager 343, the DMP driver 345, and the cluster I/O module 342. The memory 1020 may also be used for storing temporary variables or other intermediate information during the execution of instructions by the processor 1010.

The computer system 1000 may also includes devices such as a keyboard & mouse 1050, a SCSI interface 1052, a network interface 1054, a graphics & display 1056, a hard disk 1058, and a CD-ROM 1060, all of which are coupled to the processor 1010 by a communications bus 1007. It will be apparent to those having ordinary skill in the art that the computer system 1000 may also include numerous elements not shown in the figure, such as additional storage devices, communications devices, input devices, and output devices, as illustrated by the ellipsis shown. An example of such an additional computer system device is a Fibre Channel interface.

The flow charts of FIGS. 8 and 9 illustrate some of the many operational examples of the techniques disclosed in the present application. Those having ordinary skill in the art will readily recognize that certain steps or operations illustrated in FIGS. 8 and 9 may be eliminated or taken in an alternate order. Moreover, the methods described in FIGS. 8 and 9 and many of the modules illustrated in FIG. 3 are typically implemented as one or more software programs for a computer system and are encoded in a computer readable medium as instructions executable on one or more processors. The computer readable medium may include an electronic storage medium, a magnetic storage medium, or an optical storage medium, or other media, or combinations thereof. Software programs may also be encoded in a communications medium conveying signals encoding the instructions. Separate instances of these programs may be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above may be utilized in a variety of different storage devices and computing systems with variations in, for example, the number of nodes, the type of operation of the computing system, e.g., various forms of automated trespass responses, the number and type of shared data resources, and the number of paths between nodes and shared data resources.

Those having ordinary skill in the art will readily recognize that the techniques and methods discussed below may be implemented in software using a variety of computer languages, including, for example, traditional computer languages such as assembly language, Pascal, and C; object oriented languages such as C++, C#, and Java; and scripting languages such as Perl and Tcl/Tk. Additionally, software such as the blocks 342, 343, and 345 may be provided to the computer system via a variety of computer readable media including electronic media (e.g., flash memory), magnetic storage media (e.g., hard disk 1058, a floppy disk, etc.), or optical storage media (e.g., CD-ROM 1060 or a DVD ROM, etc.). Communications media conveying signals encoding the instructions (e.g., via a network coupled to network interface 1054) may similarly be used.

The present invention has been, in some cases, described in terms of providing support for A/P storage arrays. It will be appreciated, however, that present invention may also be used to support other forms of storage devices.

Although the present invention has been described in connection with several embodiments, the invention is not intended to be limited to the specific forms set forth herein. On the contrary, it is intended to cover such alternatives, modifications, and equivalents as may be reasonably included within the scope of the invention as defined by the appended claims.

What is claimed is:

1. A method comprising:
   determining that access by a first node in a computation cluster through a first controller to a storage resource has been restored;
   querying each node in a plurality of nodes to determine whether access to the resource through the first controller has been restored for each node in the plurality of nodes, wherein the plurality of nodes comprises nodes in the computation cluster for which the first controller is a fail-back target, wherein
      the querying is performed in response to the determining that access by the first node through the first controller to the resource has been restored;
   receiving a response to the querying, wherein
      the response indicates that access to the resource through the first controller has been restored for each node in the plurality of nodes; and
   instructing, based at least in part on the response, the first node to communicate with the resource through the first controller, wherein the instructing the first node to communicate with the resource through the first controller is performed in response to determining that the access to the resource through the first controller has been restored for each node in the plurality of nodes.

2. The method of claim 1, wherein the resource comprises a logical unit (LUN) or a group of logical units on a storage array.

3. The method of claim 1, comprising:
   in response to determining that access by the second node through the first controller to the resource has been restored, instructing the second node to communicate with the resource through the first controller.

4. The method of claim 1, wherein the querying the second node comprises:
   querying the second node to determine whether the first controller is a fail-back target for the second node.

5. The method of claim 1, wherein:
   the determining that access by the first node through the first controller to the resource has been restored is performed by a master node in the computation cluster;
   the querying the second node to determine whether access by the second node to the resource through the first controller has been restored is performed by the master node; and
   the instructing the first node to communicate with the resource through the first controller is performed by the master node.

6. The method of claim 5, wherein the master node comprises the first node or the second node.

7. The method of claim 1, comprising:
   monitoring a first data path from the first node through the first controller to the resource;
   wherein the determining that access by the first node to the resource through the first controller has been restored is performed in response to the monitoring.

8. The method of claim 7, comprising:
   detecting a failure of the first data path; and
   communicating between the first node and the resource through a second controller prior to the determining that access by the first node to the resource through the first controller has been restored.

9. The method of claim 7, wherein the monitoring comprises:
   transmitting detection commands from the first node through a port on the first node, wherein the port is coupled to the first data path.

10. The method of claim 9, wherein the detection commands comprise at least one of: a periodic heartbeat signal, or an inquiry command to a storage array that comprises the controller, or a read command to the storage array, or a write command to the storage array.

11. The method of claim 1, wherein the determining that access by the first node to the resource through the first controller has been restored comprises:
    transmitting a fail-back request from the first node to a master node in the cluster.

12. The method of claim 1, wherein the determining that access by the first node to the resource through the first controller has been restored comprises:
    informing a master node in the cluster that the access has been restored, wherein the informing is performed by the first node.

13. A method comprising:
    determining that a first data path is available for use by a first node in a computation cluster, wherein
       the determining is performed by the first node,
       the computation cluster comprises a plurality of computation nodes, and
       the first data path was previously unavailable to the first node;
    informing a master node in the plurality of nodes that the first data path is available for use by the first node;
    abstaining from communicating between the first node and a destination over the first data path until receiving a fail-back approval from the master node, wherein
       the abstaining occurs after the determining that the first data path is available for use by the first node, and
       the fail-back approval is based at least in part on a determination that the first data path is available for use by each node in the plurality of nodes; and
    resuming communication between the first node and the destination after receiving the fail-back approval from the master node, wherein
       the fail-back approval is received after the informing.

14. The method of claim 13, wherein the determining that the first data path is available comprises:
    transmitting detection commands from the first node through a port on the first node coupled to the first data path; and
    receiving, at the first node, a response to the detection commands.

15. A system comprising:
    a first host comprising
       a restoration detection module configured to monitor a failed communications path to a storage resource, and
       a query module configured to transmit a request for approval for a fail-back, wherein
          a plurality of hosts are coupled to the failed communications path, and the query module is configured to transmit the request in response to the restoration detection module detecting a restoration of the failed communications path; and a master host coupled to the first host, the master host comprising
 a coordination module configured to
  receive the request from the first host,
  determine, in response to the request, whether each host in the plurality of hosts is ready to perform a fail-back, and
  transmit a fail-back approval to the first host, wherein the fail-back approval is based at least in part on the request, and
   the first host is configured to abstain from communicating over the failed communications path until receiving the fail-back approval.

16. The system of claim 15, wherein the plurality of hosts comprises the master host, and the storage resource comprises a logical unit (LUN) or a group of logical units on a storage array.

17. The system of claim 15, wherein the coordination module is configured to transmit a fail-back approval to the first host only if each host in the plurality of hosts is ready to perform a fail-back.

18. The system of claim 15, wherein:
the restoration detection module is configured to transmit detection commands through a port on the first host, wherein the port is coupled to the failed communications path and the detection commands comprise at least one of: a periodic heartbeat signal, or an inquiry command to a storage array that comprises the storage resource, or a read command to the storage array, or a write command to the storage array; and
the restoration detection module is configured to detect a restoration of the failed communications path based upon a response to the detection commands.

19. A system comprising:
a first host comprising
 a first means for monitoring a failed communications path to a storage resource, and
 a second means for requesting approval for a fail-back, wherein
  a plurality of hosts are coupled to the failed communications path, and
  the second means is configured to transmit a request for approval in response to the first means detecting a restoration of the failed communications path; and
a master host coupled to the first host, the master host comprising
 a third means configured to
  receive the request for approval from the first host, and
  determine, in response to the request, whether each host in the plurality of hosts is ready to perform a fail-back, and
  transmit a fail-back approval to the first host, wherein the fail-back approval is based at least in part on the request, and
   the first host is configured to abstain from communicating over the failed communications path until receiving the fail-back approval.

20. The system of claim 19, wherein the third means is configured to transmit a fail-back approval to the first host only if each host in the plurality of hosts is ready to perform a fail-back.

21. A computer readable storage medium comprising program instructions executable on one or more processors, the computer readable medium being at least one of an electronic storage medium, a magnetic storage medium, or an optical storage medium, wherein the program instructions are configured to implement each of:
monitoring a first data path from a first node in a computation cluster through a first controller on a storage array to a resource on the storage array;
in response to the monitoring, determining that access by the first node through the first controller to the resource has been restored;
in response to the determining that access by the first node through the first controller to the resource has been restored, querying each node in a plurality of nodes to determine whether access to the resource through the first controller has been restored for each node in the plurality of nodes, wherein
 the plurality of nodes are in the computation cluster and are nodes for which the first controller is a fail-back target; and
only if access to the resource through the first controller has been restored for each node in the plurality of nodes,
 instructing the first node to communicate with the resource through the first controller.

22. A method comprising:
determining that access by a first node in a computation cluster through a first controller to a storage resource has been restored;
querying a second node in the computation cluster to determine whether access by the second node through the first controller to the resource has been restored, wherein
 the querying is performed in response to the determining that the access by the first node through the first controller to the resource has been restored, and;
receiving a response to the querying, wherein
 the response indicates that the access by the second node through the first controller to the resource has been restored, and
instructing, based at least in part on the response, the first node to communicate with the resource through the first controller, wherein
 the instructing the first node to communicate with the resource through the first controller is performed only if access to the resource through the first controller has been restored for each node in the computation cluster for which the first controller is a fail-back target.

* * * * *